United States Patent

[11] 3,612,606

[72] Inventor Richard F. Swenson
Milwaukee, Wis.
[21] Appl. No. 69,367
[22] Filed Sept. 3, 1970
[45] Patented Oct. 12, 1971
[73] Assignee Swenson Corporation
Red Granite, Wis.

[54] SEAT HAVING FOLDABLE ARMRESTS
21 Claims, 17 Drawing Figs.
[52] U.S. Cl. .................................................. 297/417,
297/396
[51] Int. Cl. ..................................................... A47c 7/54
[50] Field of Search .......................................... 297/115,
116, 150, 154, 411, 417, 162

[56] References Cited
UNITED STATES PATENTS
2,994,366 8/1961 Hoch ............................. 297/162
3,368,842 2/1968 Polsky ........................... 297/150
3,544,163 12/1970 Krein ............................. 297/417
3,547,488 12/1970 Barnes ........................... 297/154

Primary Examiner—Francis K. Zugel
Assistant Examiner—Darrell Marquette
Attorney—James E. Nilles ABSTRACT: A seat for tractors or the like, which seat has foldable armrests that can be swung from a normal forwardly facing position to a rearward position behind the backrest and out of the way. Means are provided for swingably mounting the armrests so they may be first swung approximately 90° and then to a vertical storage position behind the seat. Alternatively, the armrests can be swung about 180° from the forwardly facing position and to a directly rearwardly facing position, and then can be swung laterally to an approximately horizontal position behind the backrest of the seat. Means are provided for locking the armrests in position. Means are also provided for vertically adjusting the extension of the backrest in various adjusted positions to accommodate the back of the operator.

PATENTED OCT 12 1971

INVENTOR:
RICHARD F. SWENSON
BY: James E. Nilles
ATTORNEY

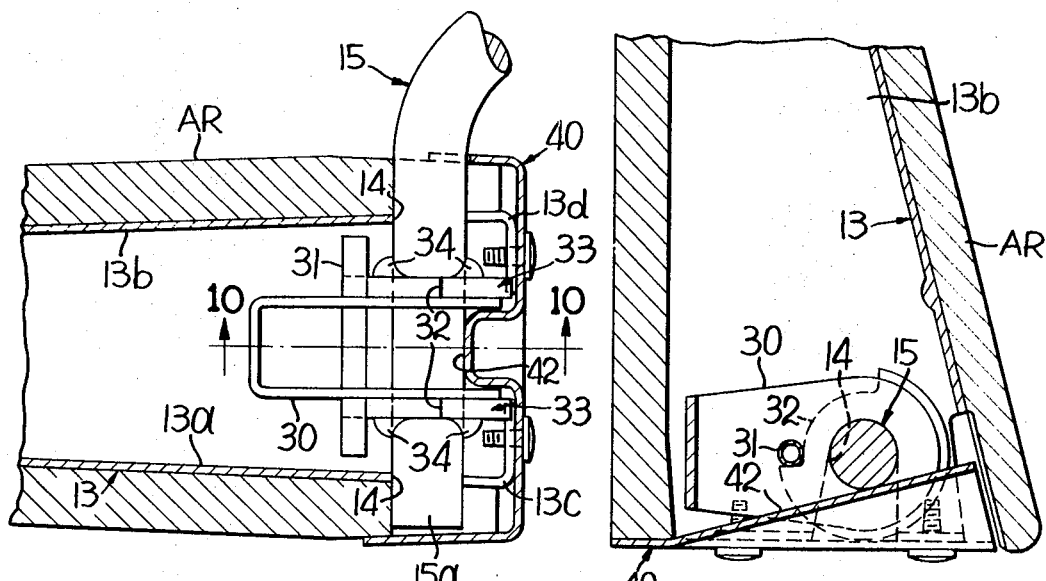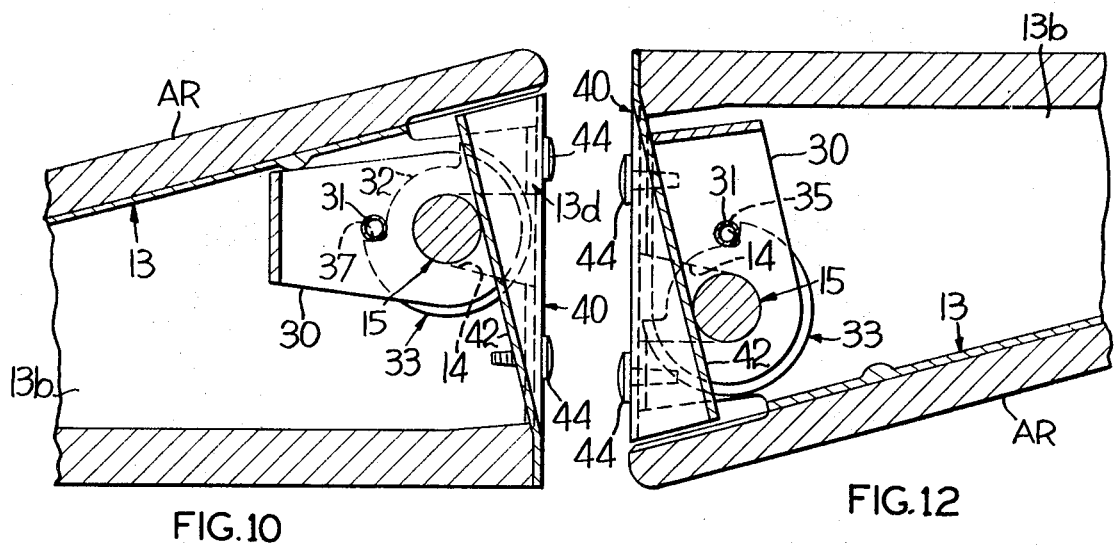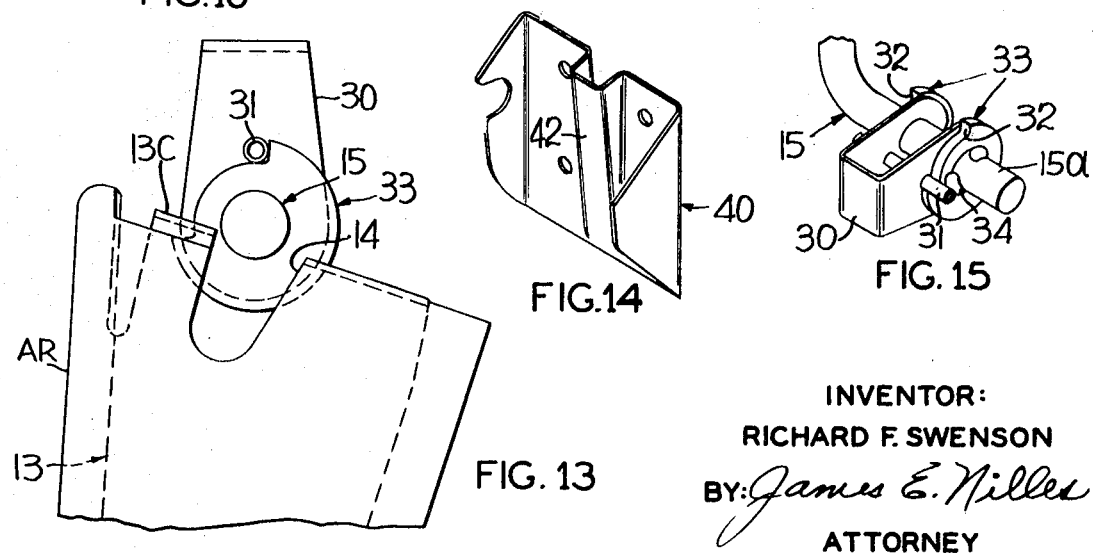

SEAT HAVING FOLDABLE ARMRESTS

BACKGROUND OF THE INVENTION

In seats for tractors, earth working vehicles, or the like, it is often necessary for the operator to swing the armrests to an out of the way position so that he can easily turn about in various directions to witness the operation of the vehicle and its attached implements. It is often necessary for the operator to turn and look backward and in doing so, some means for providing support for the operator's elbows should be provided for a good feeling of stability for the operator.

Various swingable armrests have been provided for such a vehicle seat, but they have generally been difficult to adjust without stopping the operation and have been difficult to move to a fully stored position out of the way.

SUMMARY OF THE PRESENT INVENTION

The present invention provides a seat having a backrest on which a pair of armrests are pivotally mounted for swinging from a normally horizontal and forwardly facing position to either vertical or horizontal positions behind the backrest.

One aspect of the invention further relates to swingable mounting means for such armrests whereby the armrests can be swung about a generally horizontal axis from a normally forwardly facing position, and approximately 180° to a directly rearwardly, horizontal position and then furthermore swung about 90° laterally inwardly of the backrest so that they are in a stored position facing one another behind the backrest and are completely out of the way.

A more limited aspect of the invention relates to means for positively locking the armrests in position, which locking means can be easily released when it is desired to swing the armrests to an out of the way position.

Another aspect of the invention relates to means for vertically adjusting the extension of the backrest, said adjusting means being incorporated on the same mounting as the pivotal armrest adjustment, thereby providing an economical mounting for the armrests and backrests extension.

These and other objects and advantages of the present invention will appear hereinafter as this disclosure progresses, reference being had to the accompanying drawings.

BRIEF DESCRIPTION OF THE DRAWINGS

FIG. 9 is an enlarged, horizontal sectional view of one armrest, the view being taken generally along the line 9—9 in FIG. 1;

FIG. 10 is a vertical, sectional view taken generally along the line 10—10 in FIG. 9;

FIG. 11 is a view similar to FIG. 10, but showing the armrest rotated about 90° from the showing in FIG. 10 to a generally vertical position as shown in FIG. 2;

FIG. 12 is a view similar to FIG. 11, but then showing the armrest when rotated another 90° from the FIG. 11 showing, or rotated 180° from the position shown in FIG. 1, and shows the position of the arm as shown in FIG. 3;

FIG. 13 is a disassembled view of the arm and showing how it is inserted upwardly over its supporting shaft when assembly of the arm is to be made on the shaft, certain parts being removed;

FIG. 14 is a perspective view of the metal cover for the rear end of the armrest and by means of which it is held captive on its supporting shaft;

FIG. 15 is a perspective view of the supporting shaft and the pair of stop means welded thereto and also showing the swingable bail rotatably mounted on the shaft, said swinging of the bail relative to the shaft being generally about 90° in respect thereto and as defined by the slots in the stop means;

DESCRIPTION OF A PREFERRED EMBODIMENT

Figure 5:
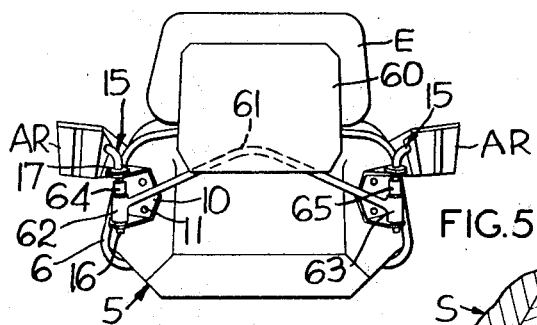
FIG. 5 is a rear view of the seat when the arms are in the position shown in FIG. 1.
Figure 7:
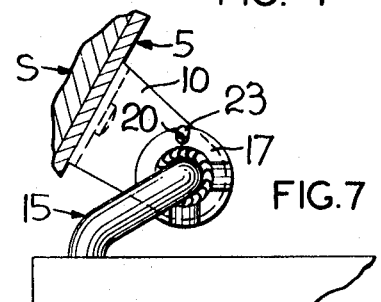
FIG. 7 is a fragmentary view, partially in section, the view being taken generally along line 7—7 in FIG. 3.

The tractor seat S includes a horizontal seating portion 1 and a backrest portion 2 which are formed integrally as a single piece from an interior material such as a flexible foam or a sponge material 3 which is then covered with a flexible, waterproof covering, such as a vinyl coated covering 4. The seat also includes a single metal shell 5 to which the flexible covering is secured around the entire periphery of the seat by means of an overlapped edging 6. The shell extends upwardly across the back of the seat as shown in FIG. 5 and provides a rigid support for mounting the armrests, now to be described.

As each of the armrests and their mountings to the backrest of the seat are similar, a description of only one of them is deemed to be either necessary or desirable.

Figure 6:
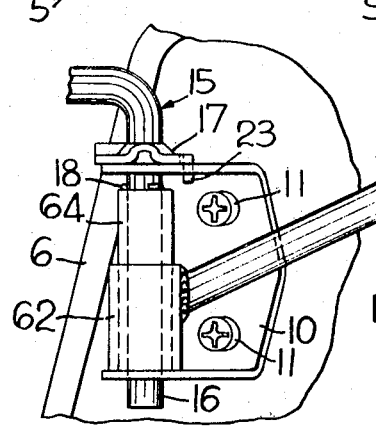
FIG. 6 is an enlarged, fragmentary view taken generally from the rear of the seat and showing the armrest mounting and the backrest extension mounting, as shown generally in FIG. 5.
Figure 8:
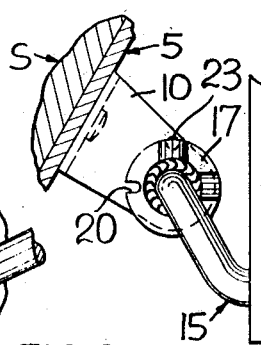
FIG. 8 is a view similar to FIG. 7, but showing the armrest rotated another 90° to a position shown in FIG. 4, the view being taken generally along the line 8—8 in FIG. 4.
Figure 16:
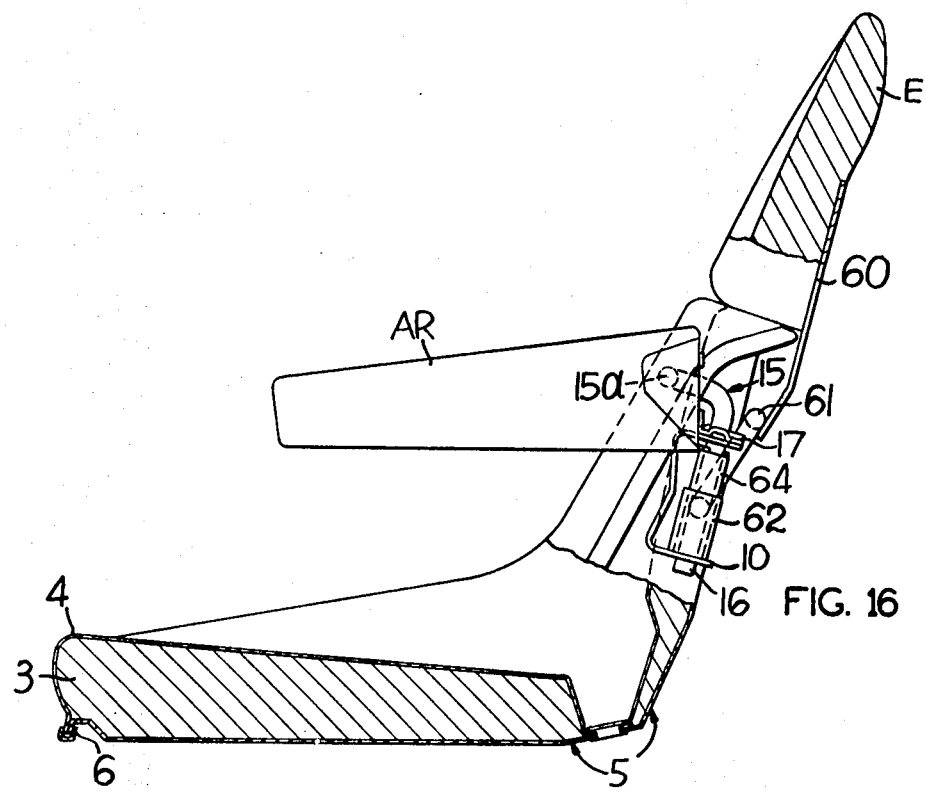
FIG. 16 is an elevational view of the seat and its armrests, the view being partially in section, and showing the armrests in the FIG. 1 position.
Figure 17:
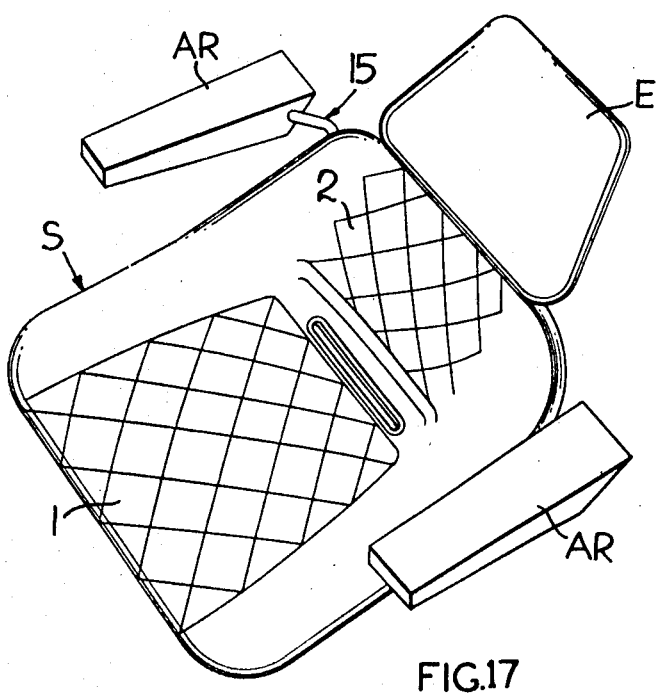
FIG. 17 is a perspective view of the entire seat and both arms made in accordance with the present invention.

The armrest is mounted by means of a U-shaped metal bracket 10 (FIGS. 5, 6 and 16) which are rigidly secured by the screws 11 to the backrest.

The armrest AR includes a metal frame 13 including sidewalls 13a and 13b which each have a inwardly turned, rearward flange, 13c and 13d, respectively. As shown in FIGS. 10, 12 and 13, these sidewalls 13a and 13b each have a recessed slot 14 for the reception of the shaft 15 of the armrest mounting. In other words, the shaft 15 has a portion 15a which extends through the rear end of the armrest and also has a generally vertically positioned portion 16. Portion 16 of the shaft extends through the rearwardly facing, bifurcated ends of the U-shaped bracket 10. Thus portion 15a of the shaft forms a generally horizontal axis about which the armrests can swing, for example up to about 180°, and portion 16 forms a generally vertical axis about which the arms can then swung, for example approximately 90°, from the position shown in FIG. 3 to the position shown in FIG. 4.

The generally right angular shaped shaft 15 is held captive in the bracket 10 by means of a locking disc 17, shown best in FIGS. 6, 7, 8, and 16 which is welded to the shaft and also be means of the locking pin 18 (FIG. 6) which extends through the shaft. The locking disc has a notch 20, shown best in FIGS. 7 and 8, which recess is adapted to receive the locking pin 23 (FIGS. 6, 7 and 8) that is fixed to the mounting bracket 10. In order to permit generally horizontal swinging of the armrest about the generally vertical portion 16 of the shaft, it is only necessary to lift the arm slightly so that the recess clears the pin 23, thereby permitting swinging of the armrest between the forwardly facing position shown in FIGS. 3 and 7, to a position shown in FIGS. 4 and 8.

Figure 3:
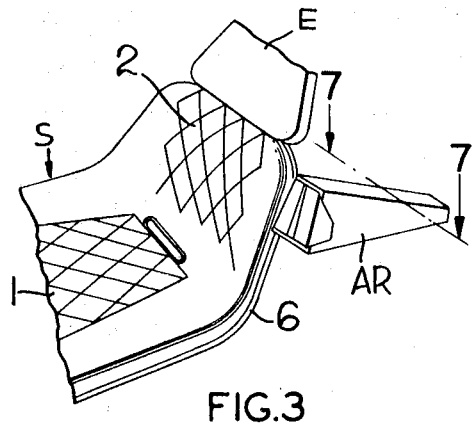
FIG. 3 is a view similar to FIG. 2, but showing the armrest being rotated another 90° to a generally rearwardly facing position.
Figure 4:
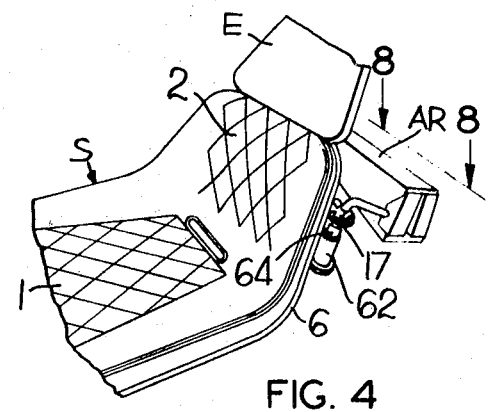
FIG. 4 is a view similar to FIG. 3, but showing the armrest then being rotated about 90° and about a generally vertical axis to a fully stored position behind the backrest.

With the above mounting, thus far described, the armrests can swing about 90° from the rearward extending position shown in FIG. 3 to a fully retracted position shown in FIG. 4.

That portion of the mounting means will now be described which permits the arm to be swung about 180° about a generally horizontal axis, namely the portion 15a of the shaft, that is from a position shown in FIG. 1 to the rearwardly extending position shown in FIG. 3.

Figure 1:
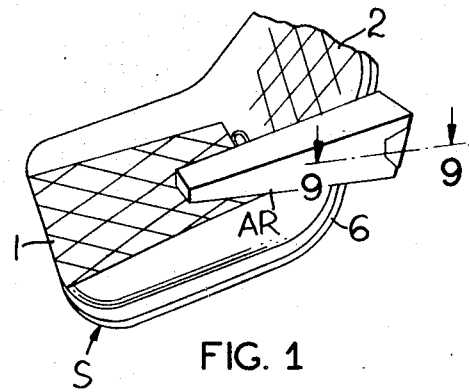
FIG. 1 is a fragmentary, perspective view of a tractor seat embodying the present invention and showing only one of the armrests, the other armrest and part of the backrest being removed for the sake of clarity.
Figure 2:
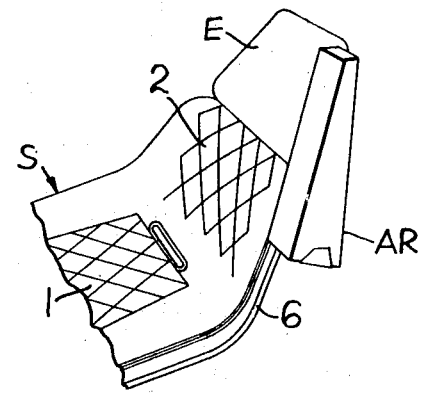
FIG. 2 is a view similar to FIG. 1, but showing the armrest rotated 90° to a generally upright position.

The armrests swing for the first approximate 90°, that is from the position shown in FIG. 1 to the position shown in FIG. 2, because they are pivotally mounted by their recessed portions 14 of the metal frame 13 which embrace the horizontal portion 15a of the shaft. A swingable member in the form of a U-shaped bail 30 is rotatably mounted, within limits, on and relative to the horizontal portion 15a of the shaft. During this initial, approximate 90° swinging motion, the bail 30 (FIG. 15) can remain in the position shown in FIGS. 10 and 15 and is not carried along with the armrests during the first approximate 90° swing. That is to say, the bail 30 remains in the position shown in FIGS. 10, 11 and 15 while the armrests swing from a horizontal position shown in FIG. 10 to the vertical position shown in FIG. 11.

A slot and pin connection is provided between the U-shaped bail 30 and the horizontal portion 15a of the shaft 15, as follows: the bail has a pin 31 extending therethrough and rigidly secured thereto, which pin 31 rides in the slots 32 of the pair of disc-shaped stop means 33 that are each welded to the shaft portion 15a, as at 34 (FIGS. 9 and 15). When the arm has reached the approximate vertical position shown in FIGS. 2 and 11, the free end of the bail 30 bears against the rear, internal end of the armrest. If it is desired to store the armrests in a vertical position behind the seat, it is only necessary to then rotate the armrests for approximately 90° about the vertical axis formed by shaft portion 16. If it is desired to store the armrests in the horizontal position behind the seat, then further continued swinging of the armrest to the position shown in FIG. 12 carries with it the bail 30. When the armrest has thus reached the end of its approximate 180° swing and comes to the position shown in FIGS. 3 and 12, the stop pin 31 then bears against the rearward shoulder 35 of the stop means 33. Further swinging of the armrest is thereby prevented by the pin 31 and the stop means 33.

In recapitulation, when the armrest is in the normal forwardly facing position shown in FIGS. 1 and 10, the metal portion 13 of the armrest abuts against the upper edge of the bail 30, which bail is prevented from downward swinging by its pin 31 bearing against the shoulder 37 (FIG. 10) of the stop means. Thus, the bail supports the arm in the normal forwardly facing horizontal position. The bail remains in the FIG. 10 position while the arm is swung through the first approximate 90° to the FIG. 11 position. The bail 30 then rotates approximately 90° when the arm is swung from the generally vertical direction position shown in FIG. 11 to the generally rearward position shown in FIG. 12, when the bail prevents further rotation of the arm in a downward direction.

As shown in FIG. 14, a metal cover 40, fabricated as a sheet metal stamping, has a central inwardly directed stop portion 42 which bears against the rear side of the shaft portion 15a when the cover 40 is fixed to the flanges 13c and 13d of the armrest by means of the screws 44.

The inwardly directed stop means 42 of the cover 40 is inserted between the legs of the bail 30 as shown in FIG. 9 and thereby holds the armrest securely in a lateral direction on the shaft portion 15a.

With the above mounting means for the armrests, the armrests can be swung first about the generally horizontal axis formed by shaft portion 15a, that is from the position shown in FIG. 1 to the position shown in FIG. 2. If the armrests are to be stored in the vertical position behind the seat, they are then rotated about the vertical axis 16 to a position behind the seat. If, however it is desired to store the armrests in the horizontal position, they are swung to the position shown in FIGS. 3 and 12 and then swung inwardly and toward one another, about the generally vertical axis formed by portion 16 of shaft 15, that is from a position shown in FIG. 3 to a fully stored position shown in FIG. 4.

When the armrest shown is stored in the position shown in FIG. 4, the portion of the armrest located adjacent the mounting bracket projects sufficiently from the side of the seat so that the operator, when he turns around to view the operation going on behind him, can rest his elbow on that particular end of the armrest. Thereby, although the armrests are in a fully stored position, a certain portion of them can be used by the operator by permitting him to rest his elbows on that portion.

Means are also provided for vertically positioning the backrest extension E relative to the backrest 2 of the seat. The backrest extension E includes a support frame including a sheet metal support 60 (FIGS. 5 and 16) fixed thereto and to which a rod 61 (FIGS. 5, 6 and 16) is welded. The rod 61 has two free ends to which are welded the tubular collars 62 and 63, (FIGS. 4, 5, 6 and 16). These collars in turn are slideably mounted on sleeves 64 and 65 which are respectively mounted on the vertical portions 16 of the shafts 15. The arrangement is such that the collars 62 and 63 can slide on the sleeves 64 and 65 and are frictionally held thereon. It is only necessary for the operator to lift or lower the extension E thereby causing the collars 62 and 63 to slide on their respective sleeves 64 and 65 and be held thereon by friction. In this manner, because of the intermediate sleeves 64 and 65, the vertical adjustment of the extension E does not affect the positioning of the armrests nor does the swinging movement of the armrests interfere with the position of the backrest extension E.

I claim:

1. A seat comprising, a backrest, a pair of armrests pivotally mounted on said backrest for swinging between normally horizontal forwardly facing position and a position behind said backrest where said armrests are inwardly directed toward one another; mounting means for swingably mounting each of said armrests on said backrest and comprising, a bracket secured to said backrest, a shaft having a generally horizontal portion on which said armrest is swingably mounted for swinging between said forwardly facing position and a generally rearwardly extending position, a swingable member rotatably mounted on said generally horizontal portion, stop means between said member and said generally horizontal portion to thereby limit said member in its swinging on said horizontal portion through an arc of about 90° relative to said horizontal position, said armrest abuttable on and supported by said member when said armrest is in said forwardly facing position, said shaft also having a generally vertical portion rotatably mounted in said bracket, releasable locking means between said vertical portion and said bracket for permitting swinging of said vertical portion and said armrest between said generally rearwardly extending position and said inwardly directed position behind said backrest.

2. The seat as set forth in claim 1 further characterized in that said armrest has an open-ended recess adjacent one end and for receiving said generally horizontal portion of said shaft whereby said armrest can rotate relative to said shaft, and removable cover means securable to said armrest and abuttable against said shaft to hold said armrest captive on said generally horizontal portion of said shaft.

3. A seat as claimed in claim 1 further characterized in that said swingable member comprises a U-shaped bail, and said stop means includes a slot and pin connection between said bail and said horizontal portion of said shaft.

4. A seat as described in claim 1 further characterized in that said releasable locking means includes a pin and multiple recess means between said vertical portion of said shaft and said bracket whereby lifting of said armrest disengages said releasable locking means.

5. The seat set forth in claim 3 including a removable cover means having a stop portion engageable in said bail for lateral holding of the armrest on said horizontal portion of said shaft and also for holding said armrest captive on said horizontal portion of said shaft.

6. The seat set forth in claim 1 including a vertically adjustable backrest extension, a support frame for said extension and having means for connection to and slideable adjustment on said armrest mounting means.

7. The seat set forth in claim 6 further characterized in that said support frame includes a pair of collars, one collar slidable on each of said generally vertical portion of said shafts.

8. The seat set forth in claim 7 including a sleeve around each of said generally vertical portion of said shafts, and said collars are mounted on and frictionally engage said sleeves.

9. A seat as claimed in claim 2 further characterized in that said swingable member comprises a U-shaped bail, and said stop means includes a slot and pin connection between said bail and said horizontal portion of said shaft.

10. A seat as described in claim 2 further characterized in that said releasable locking means includes a pin and multiple recess means between said vertical portion of said shaft and said bracket whereby lifting of said armrest disengages said releasable locking means.

11. A seat as described in claim 9 further characterized in that said releasable locking means includes a pin and multiple recess means between said vertical portion of said shaft and said bracket whereby lifting of said armrest disengages said releasable locking means.

12. The seat set forth in claim 9 including a removable cover means having a stop portion engageable in said bail for lateral holding of the armrest on said horizontal portion of said shaft and also for holding said armrest captive on said horizontal portion of said shaft.

13. A seat comprising, a backrest, a pair of armrests pivotally mounted on said backrest for swinging between a normally horizontal forwardly facing position and a position behind said backrest where said armrests are inwardly directed toward one another; said armrest each having an open-ended slot, mounting means for swingably mounting each of said armrests on said backrest and comprising, a bracket secured to said backrest, a shaft having a generally horizontal portion in said open-ended slot and on which said armrest is swingably mounted for swinging between said forwardly facing position and a generally rearwardly extending position, a removable cover means secured to said armrest and abuttable against said shaft for holding said armrest captive on said horizontal portion of said shaft, a swingable member rotatably mounted on said generally horizontal portion, stop means between said member and said generally horizontal portion to thereby limit said member in its swinging on said horizontal portion through an arc of about 90° relative to said horizontal position, said armrest abuttable on and supported by said member when said armrest is in said forwardly facing position, said shaft also having a generally vertical portion rotatably mounted in said bracket, releasable locking means between said vertical portion and said bracket for permitting swinging of said vertical portion and said armrest between said generally rearwardly extending position and inwardly directed position behind said backrest.

14. A seat as set forth in claim 13 further characterized in that said swingable member comprises a U-shaped bail, and said cover means includes a portion which is engageable by said bail for laterally holding said armrest on said horizontal portion of said shaft.

15. The seat set forth in claim 13 including a vertically adjustable backrest extension, a support frame for said extension and having means for connection to and slideable adjustment on said armrest mounting means.

16. The seat set forth in claim 15 further characterized in that said support frame includes a pair of collars, one collar slidable on each of said generally vertical portion of said shafts.

17. The seat set forth in claim 16 including a sleeve around each of said generally vertical portion of said shafts, and said collars are mounted on and frictionally engage said sleeves.

18. A seat comprising, a backrest, a pair of armrests pivotally mounted on said backrest for swinging between a normally horizontal forwardly facing position and a position behind said backrest where said armrests are inwardly directed toward one another a bracket secured to said backrest, a shaft having a generally horizontal portion on which said armrest is swingably mounted for swinging about a generally horizontal axis between said forwardly facing position and a generally rearwardly extending position, said shaft also having a generally vertical portion rotatably mounted in said bracket, releasable locking means between said generally vertical shaft portion and said bracket for permitting swinging of said generally horizontal portion of said shaft and said armrest about a generally vertical axis between said generally rearwardly extending position and said inwardly directed position behind said backrest.

19. The seat set forth in claim 18 including a vertically adjustable backrest extension, a support frame for said extension and having means for connection to and slideable adjustment on said armrest shaft in said bracket.

20. The seat set forth in claim 19 further characterized in that said support frame includes a pair of collars, one collar slidable on each of said generally vertical portion of said shafts.

21. The seat set forth in claim 20 including a sleeve around which of said generally vertical portion of said shafts, and said collars are mounted on and frictionally engage said sleeves.